(12) United States Patent
Fowler

(10) Patent No.: US 6,456,291 B1
(45) Date of Patent: Sep. 24, 2002

(54) METHOD AND APPARATUS FOR MULTI-PASS TEXTURE MAPPING

(75) Inventor: Mark C. Fowler, Hopkinton, MA (US)

(73) Assignee: ATI International SRL (KN)

( * ) Notice: Subject to any disclaimer, the term of this patent is extended or adjusted under 35 U.S.C. 154(b) by 0 days.

(21) Appl. No.: 09/457,819

(22) Filed: Dec. 9, 1999

(51) Int. Cl.$^7$ .............................................. G06T 11/40
(52) U.S. Cl. ...................... 345/582; 345/584; 345/588; 345/614; 345/719
(58) Field of Search ................................ 345/582, 583, 345/584, 585, 586, 587, 588, 589, 613, 614, 552, 560, 545, 719, 720, 722, 723, 519, 556, 506

(56) References Cited

U.S. PATENT DOCUMENTS

| | | | | |
|---|---|---|---|---|
| 5,757,374 A | * | 5/1998 | Nakamura et al. | 345/588 |
| 5,838,331 A | * | 11/1998 | DeBry | 345/584 |
| 5,870,101 A | * | 2/1999 | Murata et al. | 345/584 |
| 6,078,334 A | * | 6/2000 | Hanaoka et al. | 345/584 |
| 6,151,029 A | * | 11/2000 | Shirman et al. | 345/428 |

OTHER PUBLICATIONS

Non-patent literature, "Texture mapping by successive refinement", Horbelt, Thevenaz, Unser, Imaging Group, Swiss Federal Insti of Technol., IEEE 2000, pp. 307–310.*
Non-patent literature, "Texturing techniques for terrain visualization", Dollner, Baumann, Hinrichs, IEEE 2000, pp. 227–234, 561.*

* cited by examiner

Primary Examiner—Matthew Luu
Assistant Examiner—Thu-Thao Havan

(74) Attorney, Agent, or Firm—Vedder, Price, Kaufman & Kammholz

(57) ABSTRACT

A multi-pass pixel processing circuit and method that allows a single set of texturing circuitry to be used for performing texture mapping operations that map multiple texture maps to a video graphics primitive is presented. The multi-pass pixel processing circuit includes a raster engine that is operably coupled to receive primitive parameters corresponding to video graphics primitives. For each portion of a selected primitive, the raster engine performs a first pass of texture map coordinate generation. During the first pass, the raster engine generates a first set of texture map coordinates corresponding to a first texture map for each pixel in the portion of the selected video graphics primitive. A coordinate combination block that is operably coupled to the raster engine provides the first set of texture map coordinates for each pixel to a memory that stores the first texture map to retrieve texture data corresponding to the first texture map for each pixel. The texture data corresponding to the first texture map is then stored in a first texture map data buffer. Upon completion of the first pass, the raster engine generates a second set of texture map coordinates corresponding to a second texture map for each pixel in the portion. The coordinate combination block then combines a portion of the texture data corresponding to the first texture map that had been retrieved during the first pass for the pixel with the newly received second set of texture map coordinates to produce modified texture map coordinates. These modified texture map coordinates are then provided to the memory to retrieve texture data corresponding to the second texture map. In addition to modifying the texture coordinates used to fetch texture data corresponding to the second texture, the texture data corresponding to the first texture may also be used to modify the resulting texture data corresponding to the second texture that is fetched based on the modified texture coordinates.

26 Claims, 5 Drawing Sheets

METHOD AND APPARATUS FOR MULTI-PASS TEXTURE MAPPING

FIELD OF THE INVENTION

The invention relates generally to graphics processing and more particularly to a method and apparatus for multi-pass texture mapping in a video graphics system.

BACKGROUND OF THE INVENTION

Computers are used in many applications, and in some of these applications, detailed graphical images are generated. The generation of such detailed images may include the use of texture maps. Texture maps are often molded and adapted to overlay or map to objects, or video graphics primitives, for display. One example of the use of a texture map is mapping a checkered pattern onto a spherical structure.

In some cases, multiple textures are used to further enhance the visual details associated with different objects included in the display. For example, the surface of the spherical structure may have a topography that is covered with bumps. The presence of the bumps on the surface of the spherical structure will affect the way in which the checkered pattern is visible to an observer. As such, both the checkered texture map and a texture map corresponding to the bump covered topology of the surface of the sphere may be used to perform the texturing of the spherical structure.

In prior art systems, multiple texturing blocks were used to map multiple textures to different objects or primitives. As such, when multiple textures were to be applied to different objects, multiple texturing blocks were required in the video graphics processing circuitry. The inclusion of such additional texturing blocks increases the complexity of such circuits and adds to their cost. As such, the inclusion of multiple texturing blocks for such reasons is undesirable.

Therefore, a need exists for a method and apparatus that permits objects to be textured using multiple textures without the need for multiple texturing blocks in the video graphics processing circuitry.

DETAILED DESCRIPTION OF A PREFERRED EMBODIMENT OF THE INVENTION

The present invention provides a multi-pass pixel processing circuit and method that allows a single set of texturing circuitry to be used for performing texture mapping operations that map multiple texture maps to a video graphics primitive. The multi-pass pixel processing circuit includes a raster engine that is operably coupled to receive primitive parameters corresponding to video graphics primitives. For each portion of a selected primitive, the raster engine performs a first pass of texture map coordinate generation. During the first pass, the raster engine generates a first set of texture map coordinates corresponding to a first texture map for each pixel in the portion of the selected video graphics primitive. A coordinate combination block that is operably coupled to the raster engine provides the first set of texture map coordinates for each pixel to a memory that stores the first texture map to retrieve texture data corresponding to the first texture map for each pixel. The texture data corresponding to the first texture map is then stored in a first texture map data buffer. Upon completion of the first pass, the raster engine generates a second set of texture map coordinates corresponding to a second texture map for each pixel in the portion. The coordinate combination block then combines a portion of the texture data corresponding to the first texture map that had been retrieved during the first pass for the pixel with the newly received second set of texture map coordinates to produce modified texture map coordinates. These modified texture map coordinates are then provided to the memory to retrieve texture data corresponding to the second texture map. In addition to modifying the texture coordinates used to fetch texture data corresponding to the second texture, the texture data corresponding to the first texture may also be used to modify the resulting texture data corresponding to the second texture that is fetched based on the modified texture coordinates.

By utilizing the same circuitry to fetch texture data corresponding to a first texture map and then utilizing that data to modify the coordinates used to fetch data for a second texture map, a multi-pass texturing operation can be performed in an efficient manner that requires minimal additional circuitry. Because the first texture map that is referenced is used to modify the retrieval of data corresponding to the second texture map or to modify the data that is retrieved for the second texture map, various functions can be implemented using the first texture map that modifies the second texture map. One example is providing topographical information such as a bump pattern that corresponds to an object included in the display.

Figure 1:
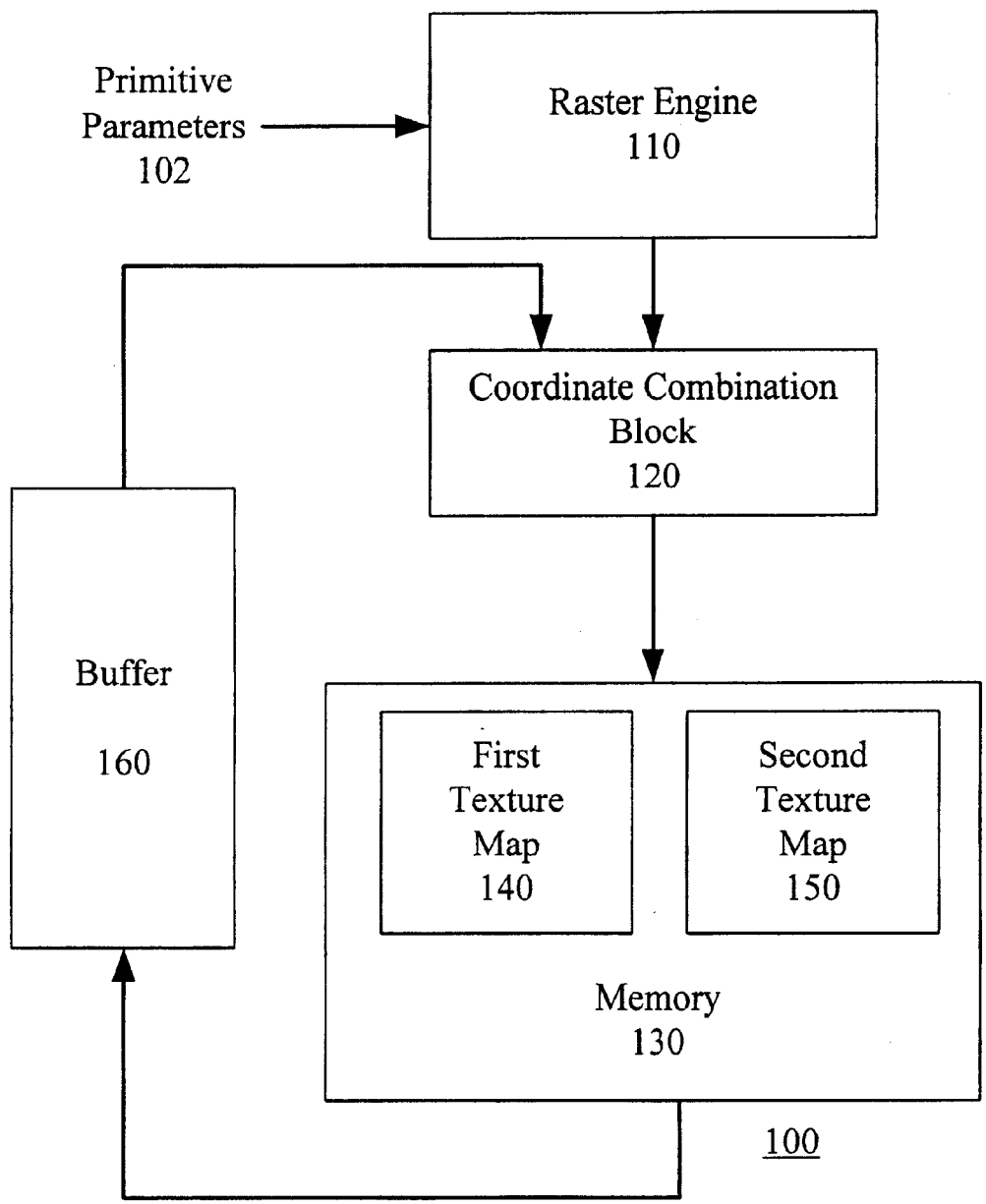
FIG. 1 illustrates a block diagram of a multi-pass pixel processing circuit in accordance with a particular embodiment of the present invention.

The invention can be better understood with reference to FIGS. 1–5. FIG. 1 illustrates a multi-pass pixel processing circuit 100 that includes a raster engine 110, a coordinate combination block 120, memory 130, and a buffer 160. In one embodiment, the circuit 100 is included in a video graphics processor that may be used to perform graphics processing functions on a personal computer. Such a video graphics processor may also include additional components that make up a three-dimensional graphics processing pipe such that the processor performs three-dimensional video graphics processing operations.

The raster engine 110 is operably coupled to receive primitive parameters 102 corresponding to video graphics primitives. Initially, the raster engine 110 generates a first set of texture map coordinates corresponding to a first texture map for each pixel in a first portion of a selected video graphics primitive. The size of the first portion of the selected primitive is based on the capacity of the buffer 160. In its overall functionality, the raster engine generates a first and second set of texture map coordinates for each pixel included in the primitive. During a first pass, the raster engine 110 generates as many first sets of texture map coordinates for as many pixels as is possible until the buffer 160 is filled. Upon filling the buffer, the raster engine 110 performs a second pass in which it generates a second set of texture map coordinates corresponding to a second texture map for each pixel in the portion for which texture data corresponding to the first texture map is already stored in the buffer 160. The raster engine 110 may include a counter or some other means for determining if it has reached the capacity of the buffer 160.

The coordinate combination block 120, which is operably coupled to the raster engine 1 10, receives the texture map coordinates generated by the raster engine 110. The coordinate combination block 120 provides the first set of texture map coordinates for each pixel to the memory 130, which is operably coupled to the coordinate combination block 120. The memory 130 stores data included in the first texture map 140 and the second texture map 150. In response to the first set of texture map coordinates, the memory 130 provides texture data corresponding to the first texture map 140.

The texture data corresponding to the first texture map 140 is stored in the buffer 160 as buffered texture data until the raster engine finishes the first pass (generating texture map coordinates corresponding to the first texture map for the first portion of the selected video graphics primitive). Upon completion of the first pass, the raster engine 110 begins the second pass in which it generates texture coordinates corresponding to the second texture map 150. During the second pass, a second set of texture map coordinates is generated for each pixel location in the first portion of the selected video graphics primitive. The second set of coordinates for each pixel as generated by the raster engine 110 is provided to the coordinate combination block 120. The coordinate combination block 120 also receives the buffered texture data corresponding to the first texture map that has been stored in the buffer 160 for each pixel. The coordinate combination block 120 combines at least a portion of the texture data corresponding to the first texture map 140 with the second set of texture map coordinates for each pixel location to produce modified texture map coordinates.

The modified texture map coordinates are then provided to the memory 130. In response to the modified texture map coordinates, the memory 130 provides texture data corresponding to the second texture map 150. Thus, the texture data corresponding to the first texture map 140 that is retrieved by the first set of texture coordinates is used to modify the second set of texture map coordinates such that the texture data fetched corresponding to the second texture map 150 is adapted based on the access to the first texture map 140. In other words, the lookup to the first texture map 140 generates a set of delta, or coordinate modification values that are used to perturb the texture coordinates corresponding to the second texture map 150. Such perturbations can be used to modify the way the second texture map 150 is applied to an object based on a surface texture of the object, such as a bumpy topography. As such, the first texture may be referred to as a "bumper" texture and the second texture as a "bumpee" texture where the coordinates generated for the "bumpee" texture are modified by the "bumper" texture.

Preferably, the buffer 160 is implemented as a first in first out (FIFO) buffer such that the buffer 160 will output the texture data that it stores in the same order as it was received. The buffer 160 may include N storage locations where N is an integer. Each storage location stores buffered texture data corresponding to a pixel. Thus, the buffer 160 can store texture data corresponding to the first texture map 140 for N pixels. As such, N pixels should be included in the portion of the video graphics primitive that is processed by the raster engine 110 at any one time. Thus, the raster engine 110 may perform a first pass operation for N pixels prior to starting the second pass.

In some embodiments, the texture data fetched from the first texture map 140 may also be used to modify the texture data that is fetched from the second texture map 150 for a particular pixel. Thus, data in the first texture map 140 can be used to modify both the coordinates used to access the second texture map 150, as well as the texture data that is retrieved from the second texture map 150. An embodiment that includes the capability of performing such modifications to the fetched texture data is illustrated in FIG. 2.

Figure 2:
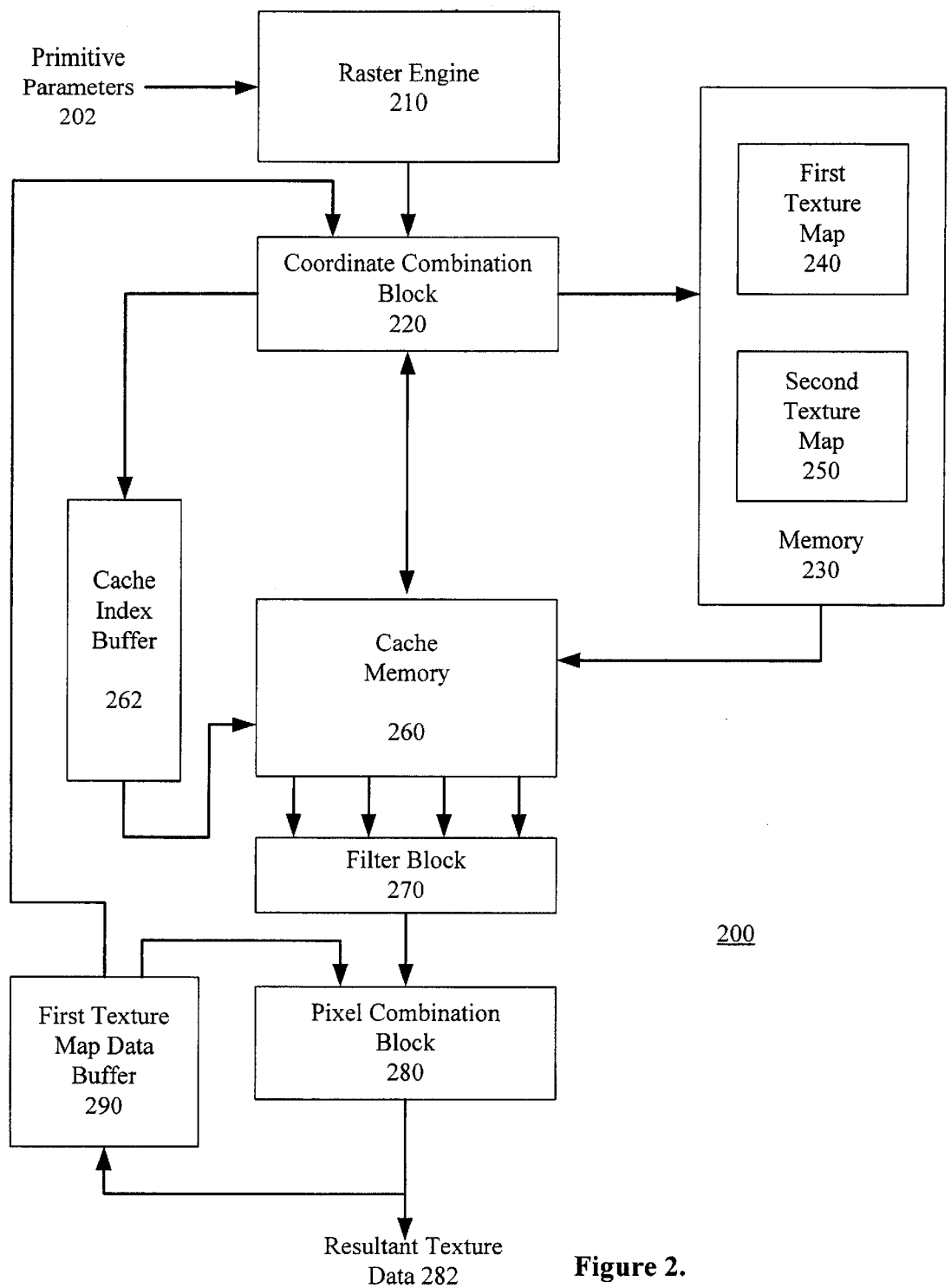
FIG. 2 illustrates a block diagram of another multi-pass pixel processing circuit in accordance with an alternate embodiment of the present invention.

FIG. 2 illustrates an alternate multi-pass pixel processing circuit 200 that includes a raster engine 210, a coordinate combination block 220, a memory 230, a pixel combination block 280, and a first texture map data buffer 290. As was the case with the circuit 100 of FIG. 1, the raster engine 210 receives primitive parameters 202 corresponding to video graphics primitives. During a first pass, the raster engine 210 generates a first set of texture map coordinates corresponding to a first texture map for each pixel in a first portion of a selected video graphics primitive. During a second pass, the raster engine generates a second set of texture map coordinates corresponding to a second texture map for each pixel in the first portion. Once again, the delineation between the first and second pass is preferably based on the storage capacity of the first texture map data buffer 290. The first texture map data buffer 290 stores texture data that has been fetched from the memory 230 during the first pass.

The coordinate combination block 220 receives the sets of texture map coordinates from the raster engine 210 and uses them to address the memory 230. Note that a memory controller may also be included in the system, where the coordinate combination block 220 provides the relevant coordinate information to the memory controller to facilitate fetching of data from the memory 230. As was the case with the memory structure in FIG. 1, the memory 230 stores the first texture map 240 and the second texture map 250.

Because fetching data from the memory 230 incurs latency (i.e. there is access time associated with fetching data from the memory 230), a cache memory structure 260 may be included in the circuit 200. When the cache memory 260 is included in the system, the coordinate combination block 220 will determine if the texture data corresponding to a set of texture coordinates is already present in the cache memory 260 prior to fetching that data from the memory 230. In either case, the coordinate combination block 220 stores a cache index for each set of texture coordinates in a cache index buffer 262. The cache index buffer 262 is then used to address the cache memory 260 to cause the cache memory 260 to output the texture data for a specific set of texture coordinates. The size of the cache memory 260 and the cache index buffer 262 may be based on the latency associated with fetching texture data from the memory 230. The cache index buffer 262 and cache memory 260 allow the circuit 200 to be pipelined in a manner that increases its overall processing throughput by absorbing the latency associated with memory accesses in the pipeline structure.

In many cases, texturing operations also involve filtering operations. In such instances, multiple texels included in a particular texture map are often fetched together and blended to produce a resultant texture color that is applied to a particular pixel during the texture mapping operations. As such, the filter block 270 may be included in the circuit 200 to facilitate such blending or filtering operations. The filter block 270 may receive texture data corresponding to a number of different texels that it then blends or combines to produce a filtered or blended texture data value. Note that the filter block 270 maybe configurable such that filtering operations are performed on texels corresponding to the first texture map 240 in a different manner then they are performed with respect to texels of the second texture map 250.

The circuit 200 also is shown to include a pixel combination block 280 that may be used to combine texture data fetched during the first pass with texture data fetched during the second pass. Once texture data corresponding to the first texture has been fetched based on the first set of texture coordinates for a particular pixel, it is stored in the first texture map data buffer 290. During the second pass, when the second set of texture coordinates for that pixel are used to fetch texture data corresponding to the second texture map 250, the data that is fetched may be combined with a portion or all of that which was fetched during the first pass to produce resultant texture data 282. In one example, the first texture map 240 includes lighting effects that may be used to modify the second texture map 250. As such, data corresponding to the lighting affects produced by the first texture map 240 are stored as part of the texture data for that pixel in the first texture map data buffer 290 during the first pass. During the second pass, such lighting effect data, or luminosity data, can be combined with the color data resulting from the texture data fetched from the second texture map 250 to produce resultant texture data 282 that includes lighting effects induced by the first texture map 240.

As was the case with the circuit 100 of FIG. 1, the texture data corresponding to the first texture map 240 that is stored in the first texture map data buffer 290 may also be used to perturb or modify the second set of texture coordinates for each of the pixels as they are generated by the raster engine 210. Such modification is performed by the coordinate combination block 220 prior to determining if data corresponding the resulting modified texture coordinates is stored in the cache memory 260.

In order to summarize the functionality of the circuit 200, a brief review of the data flow through the system may be helpful. During the first pass, the raster engine 210 generates sets of pixel coordinates that correspond to the first texture map 240. The coordinate combination block 220 determines if the texture data corresponding to these coordinates is already stored in the cache memory 260. If it is, the coordinate combination block 270 simply stores a cache index corresponding to the location of the texture data in the cache index buffer 262 for that particular pixel to which the set of texture coordinate data corresponds. If the texture data is not currently included in the cache memory 260, the coordinate combination block 220 provides the set of texture coordinates to the memory 230 which responds by providing texture data corresponding to the first texture map 240 based on the set of texture coordinates. This texture data is then stored in the cache memory 260 at a location known to the coordinate combination block 220. The coordinate combination block 220 then stores a cache index corresponding to that location in the cache index buffer 262 for the pixel to which the coordinate data corresponds.

Preferably, the cache index buffer 262 works as a pipeline for the texture lookup operations such that as new sets of texture coordinates are received, the cache indexes stored in the cache index buffer 262 cause previously stored cache indexes to address the cache memory 260 such that the texture data for each cache index is provided as output from the cache memory 260. In the case where filtering operations occur, multiple texels, or color values, may be outputted by the cache memory 260. These multiple values are then filtered or combined by the filter block 270 to produce a filtered value that may be stored directly in the first texture map data buffer 290 or provided to the pixel combination block 280. During the first pass, the pixel combination block 280 does not have previously fetched texture data with which to modify the texture data it is receiving. As such, it routes the texture data corresponding to the first texture map 240 to the first texture map data buffer 290 for storage. The first texture map data buffer 290 is thus eventually filled by the texture data fetching operations corresponding to the first pass. Once the first texture map data buffer 290 is full, the raster engine 210 begins the second pass.

During the second pass, the raster engine 210 generates texture coordinates corresponding to the second texture map 250 for each of the pixels included in the portion of the primitive that it is currently processing. The coordinate combination block 220 may then perform some modification on the second set of texture coordinates corresponding to each pixel based on texture data corresponding to the first texture map as currently stored in the first texture map data buffer 290. It is then determined if the texture data corresponding to the modified texture coordinates is currently included in the cache memory 260. The cache index buffer 262 and the cache memory 260 function in a similar manner during the second pass as the first pass, as does the filter block 270.

Once the texture data corresponding to the second texture map is provided to the pixel combination block 280 for a particular pixel, it may be modified based on texture data corresponding to the first texture map as currently stored in the first texture map data buffer 290. The resulting resultant texture data 282 then represents the texture mapping operations for a particular pixel where more than one texture has been used to perform the texture mapping operations on that pixel. Note that the memory 230 may store more than two texture maps such that the circuitry included in the circuit 200 maybe used in an iterative fashion multiple times such that each of the textures included in the memory 230 may contribute to the texturing operations performed on the primitive.

Figure 3:
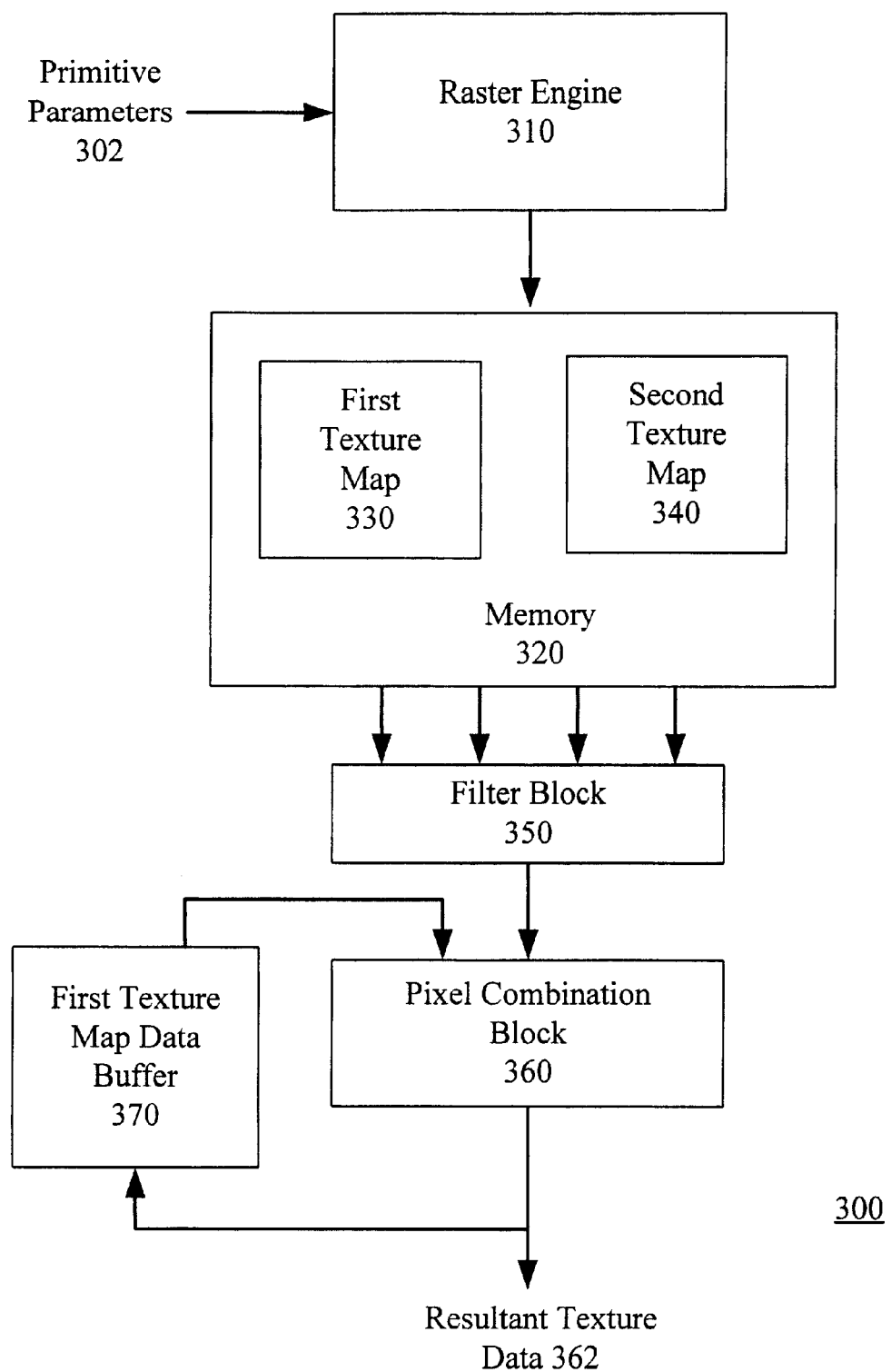
FIG. 3 illustrates a block diagram of yet another multi-pass pixel processing circuit in accordance with yet another alternate embodiment of the present invention.

FIG. 3 illustrates an alternate embodiment of a multi-pass pixel processing circuit 300 in which the texture coordinates corresponding to the second texture are not modified based on the texture data fetched corresponding to the first texture. However, the texture data corresponding to the second texture that is fetched is modified based on texture data corresponding to the first texture that is fetched during a first pass.

The multi-pass pixel processing circuit 300 includes a raster engine 310 that is operably coupled to receive primitive parameters 302 corresponding to video graphics primitives. As was the case with the raster engine 210 of FIG. 2, the raster engine 310 will perform a first and a second pass with respect to portions of graphics primitives. The size of the portions to which the first and second passes correspond is preferably determined based on the size of the first texture map data buffer 370. During the first pass, the raster engine 310 generates sets of texture coordinates corresponding to the first texture 330 that is stored in the memory 320. As the set of first texture coordinates is provided to the memory 320, the texture data corresponding to the first texture 330 that results is stored in the first texture map data buffer 370. Once the first texture map data buffer 370 is full, the first pass has completed.

During the second pass, the raster engine 310 generates a second set of texture coordinates for each of the pixels included in the portion of the primitive that is being processed. The second set of texture coordinates are provided to the memory 320 in an unmodified format. The memory 320 provides texture data corresponding to the second texture map 340 in response to the second sets of texture coordinates. The texture data resulting from the application of the second set of texture coordinates is then provided to the pixel combination block 360. The pixel combination block 360 also receives the texture data corresponding to the first texture map that was fetched for that particular pixel location during the first pass. This texture data is retrieved from the first texture map data buffer 370, which as described earlier, is preferably structured as a FIFO buffer.

The pixel combination block 360 can then combine the texture data corresponding to the first texture map with texture data corresponding to the second texture map for a particular pixel to produce resultant texture data 362. As was the case with the circuit 200 of FIG. 2, a filter block 350 may also be included in the pixel processing circuit 300 to facilitate filtering operations that are commonly employed in texture mapping operations. Similarly, a cache memory structure and cache index buffer similar to those illustrated in FIG. 2 may be included in the circuit illustrated in FIG. 3 coupled to the raster engine 310 and the memory 320 to facilitate pipelining of the texture mapping operations.

Note that the raster engine 310 will continue to process portions of graphics primitives that it receives such that once it has completed the second pass for a particular portion it moves on to a subsequent portion of a primitive or a subsequent primitive if the portion completed finishes the processing of a primitive. As was the case with the circuit 200 of FIG. 2, the memory 320 may include a plurality of texture maps such that each of the plurality of texture maps may influence the resultant texture data 362 for a particular pixel.

Figure 4:
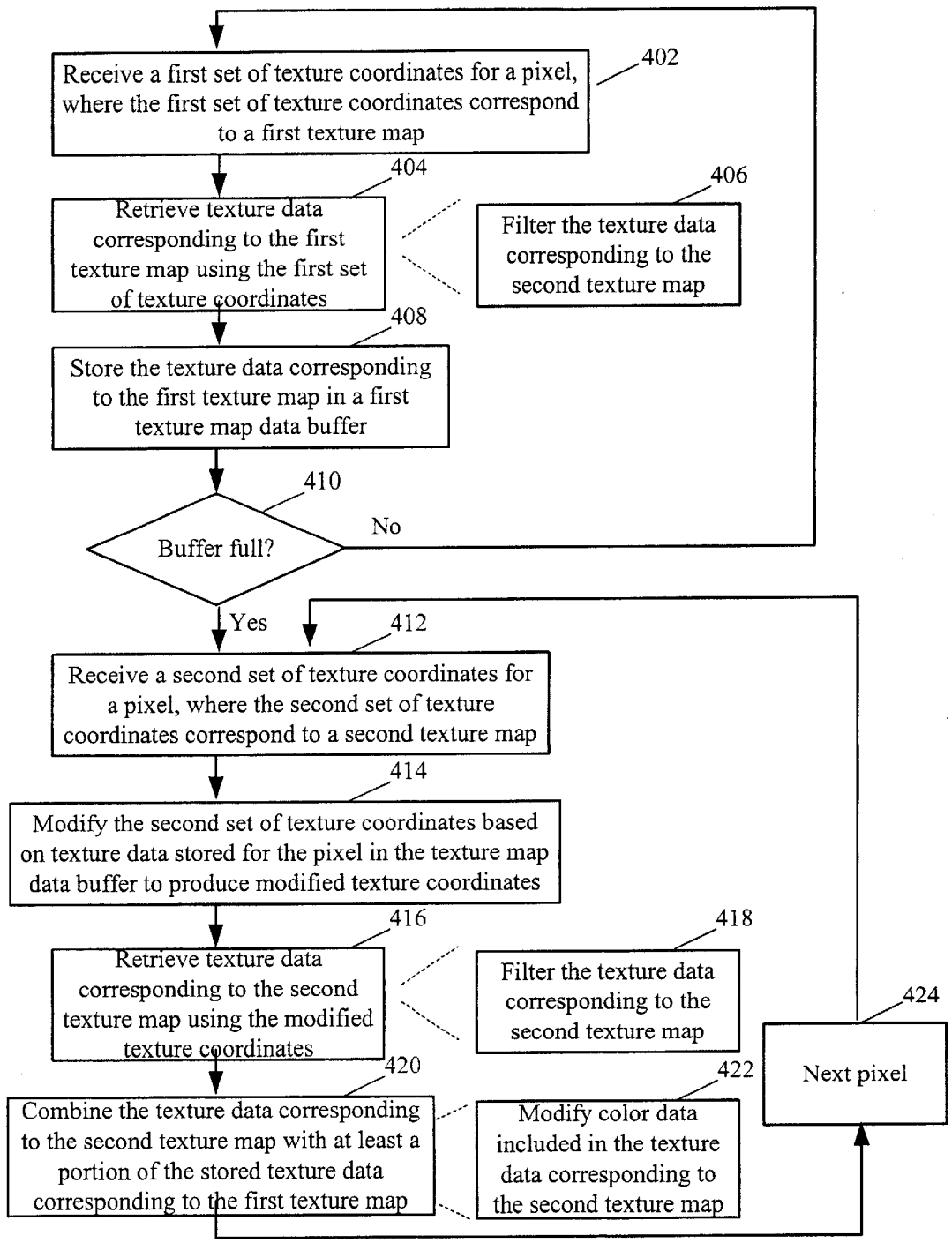
FIG. 4 illustrates a flow diagram of a method for texturing a video graphics primitive in accordance with a particular embodiment of the present invention.

FIG. 4 illustrates a flow diagram of a method for texturing a video graphics primitive in a multi-pass circuit. A step 402, a first set of texture coordinates is received for a particular pixel. The first set of texture coordinates received at step 402 correspond to a first texture map. At step 404, texture data corresponding to the first texture map is retrieved using the first set of texture coordinates. The retrieval of the texture data may include determining if the texture data is currently stored in a cache structure or providing the first set of texture coordinates to a memory controller as was described with respect to the circuits illustrated in FIGS. 1–3. The retrieval of texture data at step 404 may include the filtering of such texture data at step 406, where the filtering operation may combine numerous texels to produce a single filtered texel that is used in the subsequent steps.

At step 408, the texture data corresponding to the first texture that was retrieved at step 404 is stored in a first texture map buffer. At step 410, it is determined if the buffer in which the texture data corresponding to the first texture map is being stored is full. If the buffer is not yet full, the method returns to step 402 where a first set of texture coordinates corresponding to a subsequent pixel is received. Thus, texture lookup operations corresponding to the first texture map will continue until the buffer is filled. The determination as to whether or not the buffer is full may be based on monitoring the actual contents of the buffer or by maintaining a count as to how many texture lookup operations corresponding to the first texture map have occurred thus far.

Once the buffer is determined to be full at step 410, or possibly at the boundary of a video graphics primitive if each video graphics primitive is textured in its entirety prior to starting texturing operations for subsequent video graphics primitives, the method proceeds to step 412. At step 412, the second pass for the portion of the video graphics primitive for which first pass data is stored in the buffer begins. At step 412, a second set of texture coordinates for a pixel are received. The second set of texture coordinates are modified at step 414 based on texture data corresponding to the first texture map as stored for the pixel in the first texture map data buffer. The modification performed at step 414 results in modified texture coordinates.

At step 416, texture data corresponding to a second texture map is retrieved utilizing the modified texture coordinates. The retrieval of texture data at step 416 may include filtering operations at step 418 such that multiple texels in the second texture map are combined to produce a resulting texture data value, or color.

The method may also include step 420, where at least a portion of the texture data corresponding to the first texture map that is stored in the first texture map data buffer is combined with the texture data retrieved at step 416. Modification of the texture data retrieved at step 416 may included modification of color data at step 422 using color modification data included in the texture data corresponding to the first texture map. Thus, the color modification data may include luminosity data that modifies the color resulting from the retrieval step 416.

After step 420, the method proceeds to step 424 as long as the second pass continues. Thus, the next pixel to be processed is advanced to at step 424 unless the pixels processed during the first pass utilizing steps 402–410 have all been processed at which point the method would return to step 402 for a subsequent primitive portion.

Figure 5:
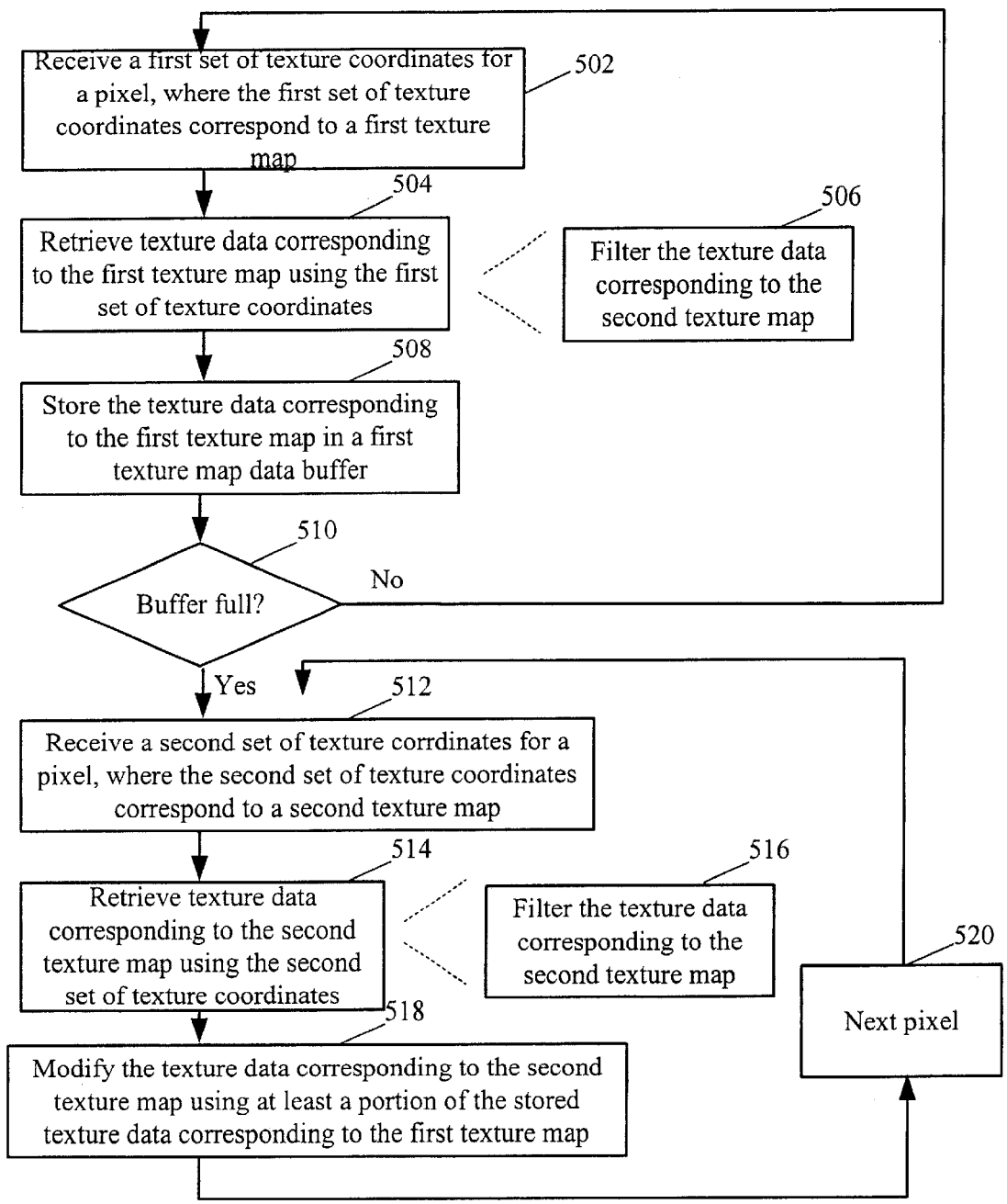
FIG. 5 illustrates a flow diagram of an alternate method for texturing a video graphics primitive in accordance with a particular embodiment of the present invention.

FIG. 5 illustrates an alternate method for texturing a video graphics primitive that is substantially similar to the method illustrated in FIG. 4 with the exception that the second sets of texture coordinates are not modified by texture data fetched during the first pass. The steps 502–512 are performed in the method of FIG. 5 in the same manner as steps 402–412 are performed in the method of FIG. 4.

The method of FIG. 5 differs from that in FIG. 4 at step 514 where texture data corresponding to the second texture map is retrieved utilizing the second set of texture coordinates without any modification. Thus, whereas in FIG. 4 the second set of texture coordinates for each pixel may be modified based on texture data during the first pass, the method of FIG. 5 simply fetches texture data corresponding to a second texture map using the texture coordinates in an unmodified format. Once again, the retrieval of texture data at step 514 may include filtering operations at step 516.

At step 518, the texture data corresponding to the second texture map is modified using at least a portion of the texture data corresponding to the first texture map that is currently stored in the first texture map data buffer. Thus, although the texture coordinates corresponding to the second texture map are not modified prior to the second texture map lookup occurring, the data resulting from the second texture map lookup may be modified based on data retrieved during the first texture map lookup operation. Thus, the method illustrated in FIG. 5 may provide a means for generating the lighting effects described earlier, but not the means for the modification of the second texture map based on a bump topography as is possible using the method of FIG. 4.

Once again, the lower loop in the method of FIG. 5 will repeat such that the next pixel is advanced to at step 520 until the second pass is completed and the texture data corresponding to the first texture map that is stored in the first texture map data buffer is exhausted.

Note that the texture map lookup operations performed in the steps of FIGS. 4 and 5 may be performed using the same memory controllers and memory structures for the first pass as for the second pass. Thus, the circuitry is used in a multi-pass technique such that each texture lookup operation produces texture data that may be fed back into the circuitry in order to allow for the modification of either the subsequent texture lookup operations or the data resulting from such texture lookup operations.

It should be understood that the implementation of other variations and modifications of the invention in its various aspects will be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A multi-pass pixel processing circuit, comprising:

a raster engine that is operably coupled to receive primitive parameters corresponding to video graphics primitives, wherein the raster engine generates a first set of texture map coordinates corresponding to a first texture map for each pixel in a first portion a selected video graphics primitive, wherein the raster engine generates a second set of texture map coordinates corresponding to a second texture map for each pixel in the first portion;

a coordinate combination block operably coupled to the raster engine, wherein the coordinate combination block combines buffered texture data corresponding to the first set of texture map coordinates with the second set of texture map coordinates to produce modified texture map coordinates corresponding to the second texture map;

memory operably coupled to the coordinate combination block, wherein the memory stores the first and second texture maps, wherein the memory provides texture data corresponding to the first texture map in response to the first set of texture map coordinates, wherein the memory provides texture data corresponding to the second texture map in response to the modified texture map coordinates; and a buffer operably coupled to the memory and the coordinate combination block, wherein the buffer stores the texture data corresponding to the first texture map as provided by the memory as buffered texture data such that the buffered texture data for each pixel of the first portion is provided to the coordinate combination block for combination with the second set of texture map coordinates for the pixel.

2. The circuit of claim 1, wherein the raster engine provides the first set of texture map coordinates for pixels in the first portion of the selected video graphics primitive to the coordinate combination block prior to providing the second set of texture map coordinates for the pixels in the first portion of the selected video graphics primitive.

3. The circuit of claim 1, wherein the first texture is a bumper texture and the second texture is a bumpee texture, wherein the bumpee texture is modified by the bumper texture.

4. The circuit of claim 3, wherein the texture data for the bumper texture includes pixel modification data that modifies the texture data corresponding to the second texture map provided in response to the modified texture coordinates.

5. The circuit of claim 4 further comprises a pixel combination block operably coupled to the memory, wherein the pixel combination block combines the pixel modification data with the texture data corresponding to the second texture map to produce resulting texture data.

6. The circuit of claim 1, wherein the buffer further comprises N storage locations where N is an integer, wherein each storage location stores buffered texture data corresponding to a pixel, wherein N pixels is a maximum number of pixels included in the first portion of the selected video graphics primitive.

7. A multi-pass pixel processing circuit, comprising:

a raster engine that is operably coupled to receive primitive parameters corresponding to video graphics primitives, wherein for a first pass, the raster engine generates a first set of texture map coordinates corresponding to a first texture map for each pixel in a first portion a selected video graphics primitive, wherein for a second pass, the raster engine generates a second set of texture map coordinates corresponding to a second texture map for each pixel in the first portion;

a memory that stores texture data for the first texture map and the second texture map;

a coordinate combination block operably coupled to the raster engine and the memory, wherein for the first pass, the coordinate combination block provides the first set of texture map coordinates for each pixel to the memory to retrieve texture data corresponding to the first texture map, wherein for the second pass, the coordinate combination block combines buffered textured data with the second set of texture map coordinates to produce modified texture map coordinates, wherein the coordinate combination block provides the modified texture map coordinates to the memory to retrieve texture data corresponding to the second texture;

a first texture map data buffer operably coupled to the memory, wherein the first texture map data buffer stores texture data corresponding to the first texture map that is retrieved from the memory during the first pass, wherein the first texture map data buffer provides a first portion of the texture data corresponding to the first texture map for each pixel to the coordinate combination block during the second pass as the buffered texture data such that the buffered texture data retrieved during the first pass for a particular pixel is provided to the coordinate combination block for combination with the second set of texture map coordinates that corresponding to the particular pixel; and a pixel combination block operably coupled to the memory and the first texture map data buffer, wherein the pixel combination block combines texture data corresponding to the second texture retrieved during the second pass for each pixel with a second portion of the texture data corresponding to the first texture map for the pixel as generated in the first pass and stored in the first texture map data buffer, wherein combination of texture data from the first and second passes produces resultant texture data.

8. The circuit of claim 7, wherein the first texture map data buffer includes N storage locations where N is an integer, wherein each storage location stores buffered data corresponding to a pixel that is retrieved during the first pass, wherein N pixels is a maximum number of pixels included in the first portion of the selected video graphics primitive.

9. The circuit of claim 8, wherein the first texture map data buffer is a first in first out (FIFO) buffer.

10. The circuit of claim 9, wherein the memory further comprises a filter block wherein the filter block blends multiple texture data values retrieved from the memory for each set of texture map coordinates to produce the texture data.

11. The circuit of claim 9 further comprises:
a cache index buffer operably coupled to the cache control block; and
a cache memory operably coupled to the memory, the cache control block, the first texture map data buffer, and the pixel combination block, wherein the cache memory caches texture data retrieved from the memory, wherein when the cache control block determines that the cache memory stores texture data corresponding to a set of texture map coordinates, the cache control block stores a cache index corresponding to the texture data in the cache index buffer, wherein when the cache control block determines that the cache memory does not store texture data corresponding to a set of texture map coordinates, the cache control block retrieves the texture data corresponding to the set of texture map coordinates from the memory and stores the texture data in the cache and stores a cache index corresponding to the texture data as stored in the cache memory in the cache index buffer, wherein texture data is provided to the first texture map data buffer and the pixel combination block using cache indexes stored in the cache index buffer.

12. A multi-pass pixel processing circuit, comprising:
a raster engine that is operably coupled to receive primitive parameters corresponding to video graphics primitives, wherein for a first pass, the raster engine generates a first set of texture map coordinates corresponding to a first texture map for each pixel in a first portion a selected video graphics primitive, wherein for a second pass, the raster engine generates a second set of texture map coordinates corresponding to a second texture map for each pixel in the first portion;
a memory that stores texture data for the first texture map and the second texture map;
a control block operably coupled to the raster engine and the memory, wherein for the first pass, the control block provides the first set of texture map coordinates for each pixel to the memory to retrieve texture data corresponding to the first texture map, wherein for the second pass, the control block provides the second set of texture map coordinates for each pixel to the memory to retrieve texture data corresponding to the second texture;
a first texture map data buffer operably coupled to the memory, wherein the first texture map data buffer stores texture data corresponding to the first texture map that is retrieved from the memory during the first pass; and
a pixel combination block operably coupled to the memory and the first texture map data buffer, wherein the pixel combination block combines texture data corresponding to the second texture retrieved during the second pass for each pixel with at least a portion of the texture data corresponding to the first texture map for the pixel as generated in the first pass and stored in the first texture map data buffer, wherein combination of texture data from the first and second passes produces resultant texture data.

13. The circuit of claim 12, wherein the first texture map data buffer includes N storage locations where N is an integer, wherein each storage location stores buffered data corresponding to a pixel that is retrieved during the first pass, wherein N pixels is a maximum number of pixels included in the first portion of the selected video graphics primitive.

14. The circuit of claim 13, wherein the first texture map data buffer is a first in first out (FIFO) buffer.

15. The circuit of claim 14, wherein the memory further comprises a filter block wherein the filter block blends multiple texture data values retrieved from the memory for each set of texture map coordinates to produce the texture data.

16. A multi-pass method for texturing a video graphics primitive, comprising:
for each pixel in a portion of the video graphics primitive:
receiving a first set of texture coordinates corresponding to a first texture map;
retrieving texture data corresponding to the first texture map using the first set of texture coordinates;
storing the texture data corresponding to the first texture map in a first texture map data buffer;
after receiving the first set of texture coordinates for each pixel in the portion, for each pixel in the portion:
receiving a second set of texture coordinates corresponding to a second texture map;
modifying the second set of texture coordinates based on texture data corresponding to the first texture map as stored for the pixel to produce modified texture coordinates; and
retrieving texture data corresponding to the second texture map using the modified texture coordinates.

17. The method of claim 16 further comprises filtering the texture data corresponding to the second texture map for each pixel to produce filtered texture data.

18. The method of claim 16 further comprises filtering the texture data corresponding to the first texture map for each pixel prior to storing.

19. The method of claim 16 further comprises, for each pixel:
combining the texture data corresponding to the second texture map with at least a portion of the texture data corresponding to the first texture map to produce resultant texture data.

20. The method of claim 19, wherein combining further comprises modifying color data included in the texture data corresponding to the second texture map using color modification data included in the texture data corresponding to the first texture map.

21. The method of claim 16, wherein size of the portion of the video graphics primitive is determined based on size of the first texture map data buffer.

22. A multi-pass method for texturing a video graphics primitive, comprising:
for each pixel in a portion of the video graphics primitive:
receiving a first set of texture coordinates corresponding to a first texture map;
retrieving texture data corresponding to the first texture map using the first set of texture coordinates;
storing the texture data corresponding to the first texture map in a first texture map data buffer;
after receiving the first set of texture coordinates for each pixel in the portion, for each pixel in the portion:
receiving a second set of texture coordinates corresponding to a second texture map;
retrieving texture data corresponding to the second texture map using the second set of texture coordinates; and
modifying the texture data corresponding to the second texture map using at least a portion of the texture data corresponding to the first texture map as stored for the pixel, wherein modifying produces resultant texture data for the pixel.

23. The method of claim 22 further comprises filtering the texture data corresponding to the second texture map for each pixel prior to modification.

24. The method of claim 22 further comprises filtering the texture data corresponding to the first texture map for each pixel prior to storing.

25. The method of claim 22, wherein modifying further comprises modifying color data included in the texture data corresponding to the second texture map using color modification data included in the texture data corresponding to the first texture map.

26. The method of claim 22, wherein size of the portion of the video graphics primitive is determined based on size of the first texture map data buffer.

* * * * *